UNITED STATES PATENT OFFICE.

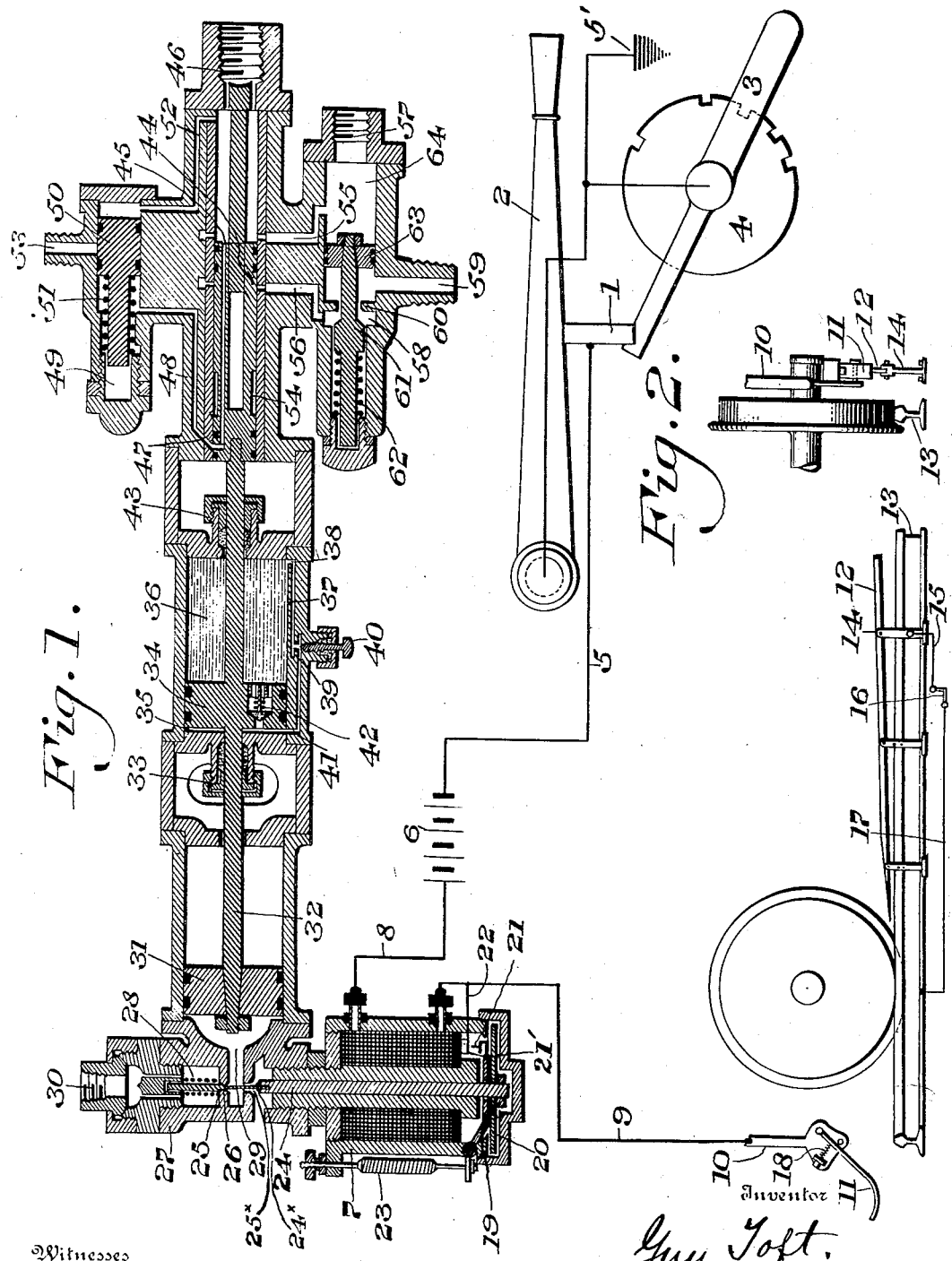

GUY TOFT, OF CAMDEN, NEW JERSEY, ASSIGNOR OF THREE-FOURTHS TO THOMAS MARRIN, OF PHILADELPHIA, PENNSYLVANIA.

AUTOMATIC TRAIN-CONTROLLER.

No. 886,741.  Specification of Letters Patent.  Patented May 5, 1908.

Application filed January 2, 1907. Serial No. 350,480.

*To all whom it may concern:*

Be it known that I, GUY TOFT, a citizen of the United States, residing in the city and county of Camden, State of New Jersey, have invented a new and useful Automatic Train-Controller, of which the following is a specification.

My invention relates to automatic train controllers and consists of means for operating the air brakes automatically, should a signal be set.

It further consists of other novel features of construction, all as will be hereinafter fully set forth.

Figure 1 represents a partial sectional view and partial diagrammatic view of an automatic train controller showing a portion of the track. Fig. 2 represents an elevation of a portion of the device and track with a wheel thereon.

Similar numerals of reference indicate corresponding parts in the figures.

Referring to the drawings:—The object of my invention is to control a train in such a manner that the air brakes are set automatically without any act of the engineer or operator and is designed to prevent a train from passing a signal when it is placed at danger, but which device will not affect the air brakes when the signal is clear. In the drawings I have shown a construction for accomplishing this result, but it will be evident that other instrumentalities may be employed which will operate successfully and I do not, therefore, desire to be limited in every instance to the construction as herein shown and described, but desire to make such changes as will come within the scope of my invention.

1 designates a contact piece which is suitably connected adjacent the throttle lever 2 of the engine and the lever 3 of the air brake controller 4, it being understood that said contact piece is of any desired construction or size and is connected by the conductor 5 with a battery 6. The air brake controller 4 is of suitable construction, being provided with notches or other means to which the lever 3 is moved, in order to control the air brakes, said notches being for "emergency," "service," "onlap," "running" and "release," the lever, in the present instance being shown "onlap" and the air brake controller is adapted to operate the air brakes in the usual manner, and as is customary, the discharge of the air in "service" is known to be from ten to fifteen pounds and for "emergency" twenty pounds.

7 designates an armor clad magnet which is connected with the battery 6 by the conductor 8, said magnet also having the conductor 9 leading therefrom which is connected with a support 10, which is secured to the engine or car and which carries the contact shoe 11 in such a manner that the same will bear against the contact piece 12, which is situated adjacent the track 13. The position of the contact piece 12, track 13, support 10 and shoe 11 will be best understood from Fig. 2, it being noted that the contact piece 12 is carried by the support 14 which is insulated from the main rail and which has a conductor 15 connected therewith which is connected with a switch 16, between which and the track 13 is a conductor 17, it being understood that said switch 16 is in suitable connection with the signal and is so arranged that when the signal is "clear" the switch 16 is open, but when the signal is at "danger" the said switch 16 is closed, for reasons as will be hereinafter described. The contact piece 11 is yieldingly held in the proper position by a spring 18 and is pivotally mounted upon the support 10. The armor clad magnet may be, if desired, constructed or designed in any manner which will accomplish the work and in the drawings I have shown one form which is particularly adapted for work of this character and which is provided with two armatures 19 and 20, 19 in the present instance being a small armature which is provided with a contact point 21.

As here shown the contact point 21 is located adjacent the binding post 21', suitably mounted upon the magnet 7, and to which binding post a branch 22 leads from the conductor 9, so that as soon as the contact 11 closes the main circuit through the conductors 8 and 9, the battery 6, conductor 5, to the ground, it will be clear that the magnet will be energized. In order that the circuit in which this magnet is included may energize the same an appreciable length of time to operate the automatic brake control, a second or auxiliary armature 19 is provided which is adapted to respond to a very small energization of the magnet and thereby bring its contact 21 into engagement with the binding post 21'. The engagement of the binding post and contact 21 immediately forms a second circuit in which the contact 11 is not included, the same running from the battery 6 through the conductor 8, magnet 7, branch 22, binding post 21', contact 21 to armature 19 and thence by way of the frame of the locomotive to the controller 4 or throttle lever 2 and back to the battery by the conductor 5. It will be apparent that by this double armature I am enabled to obtain a controlling apparatus which is very sensitive and responds to the slightest contact which may be made when a danger point exists. In previous devices operating along this same line, the operation of the controlling mechanism has not been at all sure in view of the fact that the moving contact is usually going at such a high velocity that it does not make a sufficiently long contact with the stationary contact to produce operation of the mechanism.

A spring 23, having one end in suitable connection with the stationary part of the casing of the magnet is connected with the small armature 19 to hold the same in normal position. In regard to the parts hereinbefore described, it will be noted, when the throttle lever 2 of the engine or the lever 3 of the air brake controller are in running position or in the position seen in Fig. 1, that either or both of these levers are connected to a ground 5' on the engine frame and are in contact with the contact piece 1 and as the engine or train moves the shoe 11 will contact with one of the contact pieces 12, a number of which are situated at suitable points along the track with respect to the signals, and if the signal with which the shoe contacts is "clear", as before stated, the switch 16 is open so that no current is formed, although the shoe 11 will contact with the contact piece 12, as before stated. Should, however, the signal be at "danger," the switch 16 is closed and as the shoe 11 strikes the contact piece 12 a complete circuit will be formed, from the levers 2 and 3 through the conductors 5 and 8, battery 6 and magnet 7, through the conductor 9, shoe 11, contact piece 12, conductors 15 and 17 and switch 16 to the rail or track 13 then by ground 5' to levers 2 and 3. This immediately energizes the magnet 7 and actuates the armatures and the air brakes will be automatically set by means thereof, actuated by the armatures, said means being hereinafter described, it being understood, however, that this occurs without any action on the part of the engineer or operator and that the train will thus be automatically stopped should the signal be at "danger," but if the signal is "clear" no action of the device will take place, so that the air brake will not be set and the movement of the train will not be affected.

The armature 20 controls a valve stem 24, which carries the valve $24^\times$ for the port $25^\times$ in the casing and also carries a pin valve 25 adapted to close the port 26 in the casing 27, said pin valve having a spring 28 acting thereupon, for normally holding the same in position, and said port 26 forming communication between the chamber 29 and the air supply passage 30, which leads to a suitable reservoir containing air. When the valve 25 is closed, however, the air cannot pass through the port 26 but when the said valve 25 is raised from its seat by the armature 20 the air immediately passes through the port 26 into the chamber 29 where it acts upon the face of a piston 31 movable in said chamber 29, and which has connected therewith the rod 32, the latter passing through a suitable stuffing box 33 and having connected therewith a second piston 34 which is movable in a chamber 35, which is filled with a suitable fluid 36. The wall of the casing 27 is provided with a passage 37, adjacent the chamber 35, and has a port 38 therein forming a communication between one end of the chamber 35 and said passage 37, and in said passage is a valve seat 39 which is opened and closed by a controller or valve 40, which serves to regulate or control the amount of fluid passing through said passage 37, it being noted that said passage 37 has a port forming a communication between the same and the chamber 35 on the opposite side of the piston 34 from that with which the port 38 communicates. It will be seen in this manner that as the piston 31 moves to the right from its position seen in Fig. 1, that it will carry with it the piston 34 which forces out the fluid 36 from the chamber 35, through the port 38 into the passage 37 and from thence through the port 41 in the chamber 35 to the opposite side of the piston 34, it being noted that the amount of fluid passing through said passage 37 can be controlled by the controller 40 so that the speed with which the piston 34 moves can be regulated and be quicker or slower, as desired.

In order that the fluid 36 can return to its former place in the chamber 35, that is in front of the piston 34, a check valve 42 is provided, in the piston 34, it being noted that on the forward stroke, that is to the right of its position seen in Fig. 1, the check valve 42 is closed, but that when the piston 34 moves rearwardly, or to the left, the fluid which has meanwhile passed to the rear of said piston 34, forces open the check valve 42 and the fluid passes to the front of the piston 34 into the position seen in Fig. 1. The rod 32 passes through a stuffing box and has connected therewith at its outer end a piston valve 44, which valve is provided with a passage 45 communicating with the port 46 of the casing, which is connected in any suitable manner with the engine brake valve, and said passage 45 being adapted to register, when the parts are in their normal position, with a passage 47 in the casing 48 carried by or connected with the casing 27, said passage 47 communicating with a chamber 49 in which is situated a valve 50 upon which acts the spring 51, so that it will be seen that the air from the engine brake valve in the normal position of the parts, passes through the passage 45 and passage 47 and into the chamber 49 upon the left side of the piston 50, so that the pressure of the air, together with the action of the spring 51, the valve 50, is held in the position seen in Fig. 1, by means of the fact that a passage 52, in suitable connection with the engine brake valve, communicates with the chamber 49 upon the right hand side of the valve 50, but the pressure from the engine brake valve upon this side being not sufficient to overcome the pressure of the air and the spring 51 on the left side of the valve 50 until the air pressure on the left side is relieved. When, however, the piston valve 44 moves to the right in the figure, communication is cut off from the passage 47, preventing air from passing therethrough and the air will pass through the passage 52 and will move the valve 50 to the left, overcoming the tension of the spring 51, so that the air can pass through the port 53, which is connected with a whistle or other indicator, and operates the same. The piston valve 44 is also provided with the port 54 which is normally closed, as seen in Fig. 1, but when the valve 44 is moved to the right in the figure the said port, which is of suitable extent, will form a communication between the passages 55 and 56 in the casing. The passage 55 communicates with a port 57 in suitable connection with the train line of the air brake, so that when the port 54 is moved into proper position the air from the train line will pass through the passage 55, port 54, to the passage 56, which communicates with the chamber 58, from which leads the passage 59, so that the air from the train line will be discharged and the air brakes will be immediately set, and the train is brought to a standstill, it being noted that in the chamber 58 is the valve seat 60 for the valve 61, which is actuated by a spring 62 and said valve 51 carries a piston 63 in a chamber 64, which by giving the right tension can be made to actuate at any release of pressure desired.

Having thus described my invention, what I claim as new and desire to secure by Letters Patent, is:—

1. In a device of the character described, a throttle lever, a contact in the path thereof, a second contact for closing a circuit when a danger condition exists, means for maintaining said circuit closed and means actuated by the current in the circuit for setting the air brakes.

2. In a device of the character described, a throttle lever, a contact normally engaged by said lever in running position, a second contact for closing a circuit when a danger condition exists, means for maintaining said circuit closed and means actuated by the current in the circuit for setting the air brakes.

3. In a device of the character described, a contact piece adapted to be in contact with the air brake controller lever or the throttle lever, means for closing the circuit when the signal is set at danger, and means actuated by the current in the circuit for setting the air brakes.

4. In a device of the character described, a throttle lever, a controller lever, a contact located in the path of said levers, means for closing a circuit when a danger condition exists, and means actuated by a current in the circuit for setting the air brakes.

5. In a device of the character described, a throttle lever, a controller lever, a contact located in the path of said levers, a magnet, means for closing a circuit including said magnet, and means actuated by said magnet for controlling the air brakes.

6. In a device of the character described, a magnet, means for closing the circuit connected with said magnet, a valve controlled by said armature adapted to be open for permitting the passage of air therethrough, a piston actuated by said air pressure, and fluid means for regulating the movement of said piston.

7. In a device of the character described, a magnet, means for closing the circuit in which said magnet is situated, an armature for said magnet, a valve suitably connected with said magnet and adapted to be opened to permit passage of air therethrough, a piston upon which said air pressure acts, a fluid acted upon by said piston, and means for regulating the flow of said fluid to regulate movement of said piston.

8. In a device of the character described, a magnet, means for closing the circuit in which said magnet is situated, an armature for said magnet, a valve suitably connected with said magnet and adapted to be opened to permit passage of air therethrough, a piston upon which said air pressure acts, a fluid acted upon by said piston, means for regulating the flow of said fluid to regulate the movement of said piston, and means for permitting the return of the fluid to its normal position.

9. In a device of the character described, a magnet, means for closing the circuit in which said magnet is suitated, an armature for said magnet, a valve suitably connected with said magnet and adapted to be opened to permit passage of air therethrough, a piston upon which said air pressure acts, a fluid acted upon by said piston, means for regulating the flow of said fluid to regulate the movement of said piston, and a valve in said piston for permitting the fluid to return to its normal position.

10. In a device of the character described, a magnet, means for closing the circuit in which said magnet is situated, a valve controlled by said magnet and when open permitting passage of air therethrough, a piston acted upon by said air pressure, a valve carried by said piston and controlling the air brake system, a valve situated between said air brake system and the exhaust, an indicator controlled by said air brake system valve, and a valve between the said indicator and said air brake system valve.

11. In a device of the character described, a throttle lever, a contact located in the path of said lever, a magnet, means for closing a circuit including said magnet, auxiliary means for retaining said magnet energized, and means actuated by said magnet for controlling the air brakes.

12. In a device of the character described, a throttle lever, a contact located in the path of said lever, a magnet, a plurality of armatures therefor, means for inclosing a circuit including said magnet, and means actuated by said magnet for controlling the air brakes.

13. In a device of the character described, a throttle lever, a contact located in the path of said lever, a magnet, means for closing a circuit including said magnet, an armature adapted to close a second circuit including said magnet, and a second armature actuated by said magnet for controlling the air brakes.

GUY TOFT.

Witnesses:
JOHN A. WIEDERSHEIM,
C. D. McVAY.